US011805946B2

(12) United States Patent
Saito et al.

(10) Patent No.: US 11,805,946 B2
(45) Date of Patent: Nov. 7, 2023

(54) COFFEE MACHINE

(71) Applicant: DAITO GIKEN, INC., Tokyo (JP)

(72) Inventors: Toshio Saito, Tokyo (JP); Takayuki Wakabayashi, Tokyo (JP)

(73) Assignee: DAITO GIKEN, INC., Tokyo (JP)

( * ) Notice: Subject to any disclaimer, the term of this patent is extended or adjusted under 35 U.S.C. 154(b) by 0 days.

(21) Appl. No.: 18/026,238

(22) PCT Filed: Oct. 24, 2022

(86) PCT No.: PCT/JP2022/039436
§ 371 (c)(1),
(2) Date: Mar. 14, 2023

(87) PCT Pub. No.: WO2023/090056
PCT Pub. Date: May 25, 2023

(65) Prior Publication Data
US 2023/0255406 A1 Aug. 17, 2023

(51) Int. Cl.
*A47J 42/56* (2006.01)
*A47J 42/44* (2006.01)
*A47J 42/46* (2006.01)
*A47J 42/26* (2006.01)

(52) U.S. Cl.
CPC .............. *A47J 42/56* (2013.01); *A47J 42/26* (2013.01); *A47J 42/44* (2013.01); *A47J 42/46* (2013.01)

(58) Field of Classification Search
CPC .. A47J 42/56; A47J 42/26; A47J 42/44; A47J 42/46; B02C 25/00
See application file for complete search history.

(56) References Cited

U.S. PATENT DOCUMENTS

| 9,510,710 | B1* | 12/2016 | Kaminski | ............... A47J 42/44 |
| 9,675,211 | B2* | 6/2017 | Lehotay | .................. A47J 42/50 |
| 2010/0170971 | A1 | 7/2010 | Doglioni Majer | |

(Continued)

FOREIGN PATENT DOCUMENTS

| JP | H03-41635 U | 4/1991 |
| JP | H03-193012 A | 8/1991 |

(Continued)

OTHER PUBLICATIONS

Nov. 29, 2022 International Search Report issued in International Patent Application No. PCT/JP2022/039436.

(Continued)

*Primary Examiner* — Faye Francis
(74) *Attorney, Agent, or Firm* — Oliff PLC

(57) ABSTRACT

A coffee machine including a grinder configured to grind coffee beans, and a coffee machine made to return a grinder falling into an abnormal state to a normal state. The grinder configured to grind the coffee beans by a predetermined rotation operation in the normal state, and an operation portion are provided, when the grinder is in the abnormal state (bean clogging state) in which the predetermined rotation operation cannot be performed, if the operation portion is operated, the reverse rotation operation is executed in a direction opposite to that of the predetermined rotation operation, and in the normal state, the reverse rotation operation is not executed even if the operation portion is operated.

5 Claims, 12 Drawing Sheets

(56) References Cited

U.S. PATENT DOCUMENTS

| | | | | |
|---|---|---|---|---|
| 2012/0024160 A1* | 2/2012 | Van Os | .................. | A47J 31/42 |
| | | | | 426/115 |
| 2013/0095219 A1* | 4/2013 | de Graaff | .................. | B65B 1/12 |
| | | | | 99/286 |
| 2016/0287016 A1 | 10/2016 | Lammers et al. | | |
| 2017/0368554 A1* | 12/2017 | Nichols | .................. | B65D 25/04 |
| 2018/0279831 A1 | 10/2018 | Ottavi | | |
| 2019/0022660 A1* | 1/2019 | Abbiati | .................... | B02C 7/14 |

FOREIGN PATENT DOCUMENTS

| | | |
|---|---|---|
| JP | H05-184469 A | 7/1993 |
| JP | 2010-527677 A | 8/2010 |
| JP | 2017-501761 A | 1/2017 |
| JP | 2019-030433 A | 2/2019 |

OTHER PUBLICATIONS

Aug. 9, 2022 Decision to Grant a Patent issued in Japanese Patent Application No. 20201-186502.

* cited by examiner

[Figure 1]
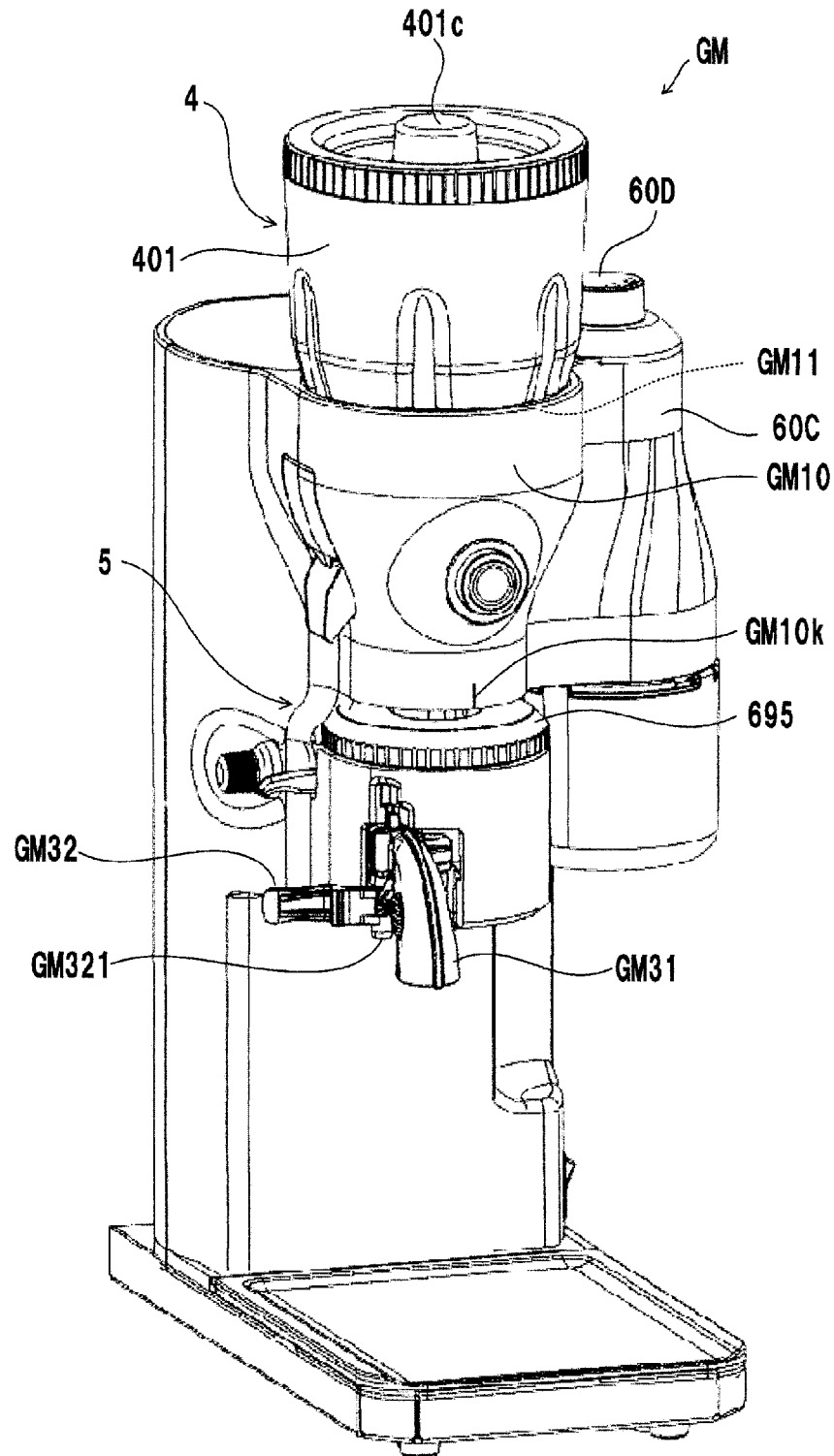

[Figure 2]
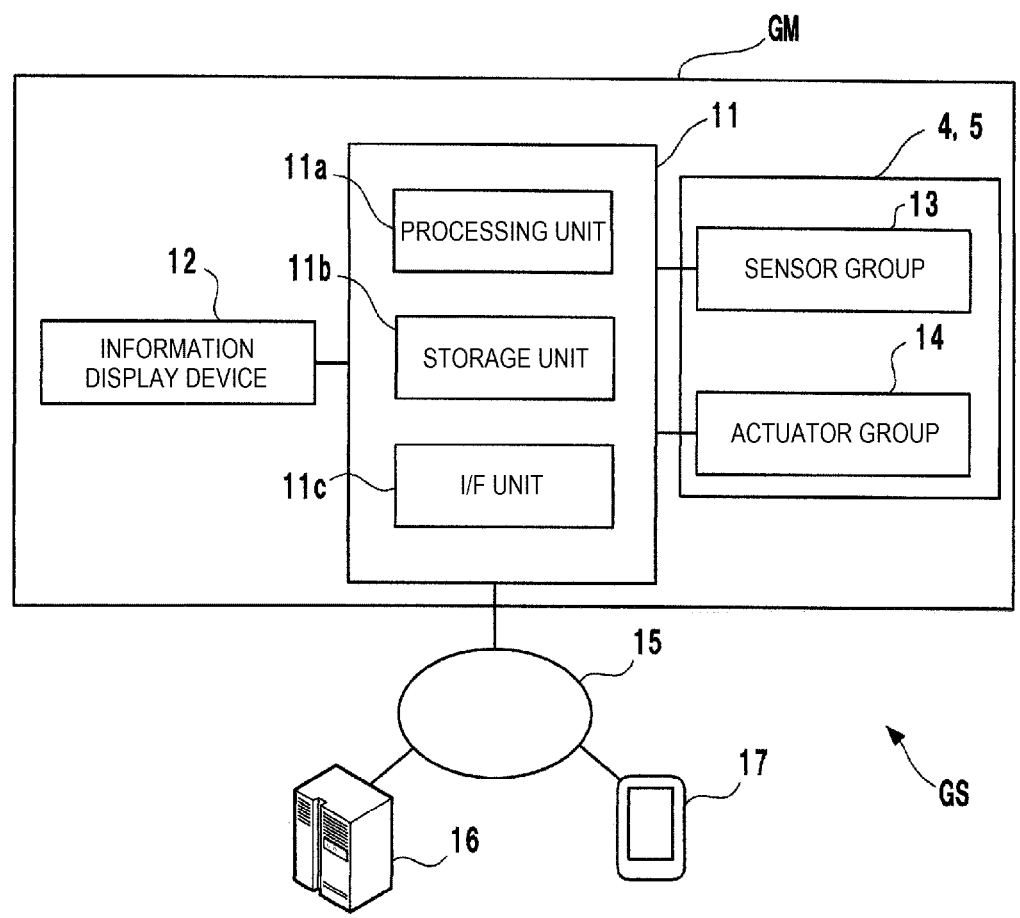

[Figure 3]
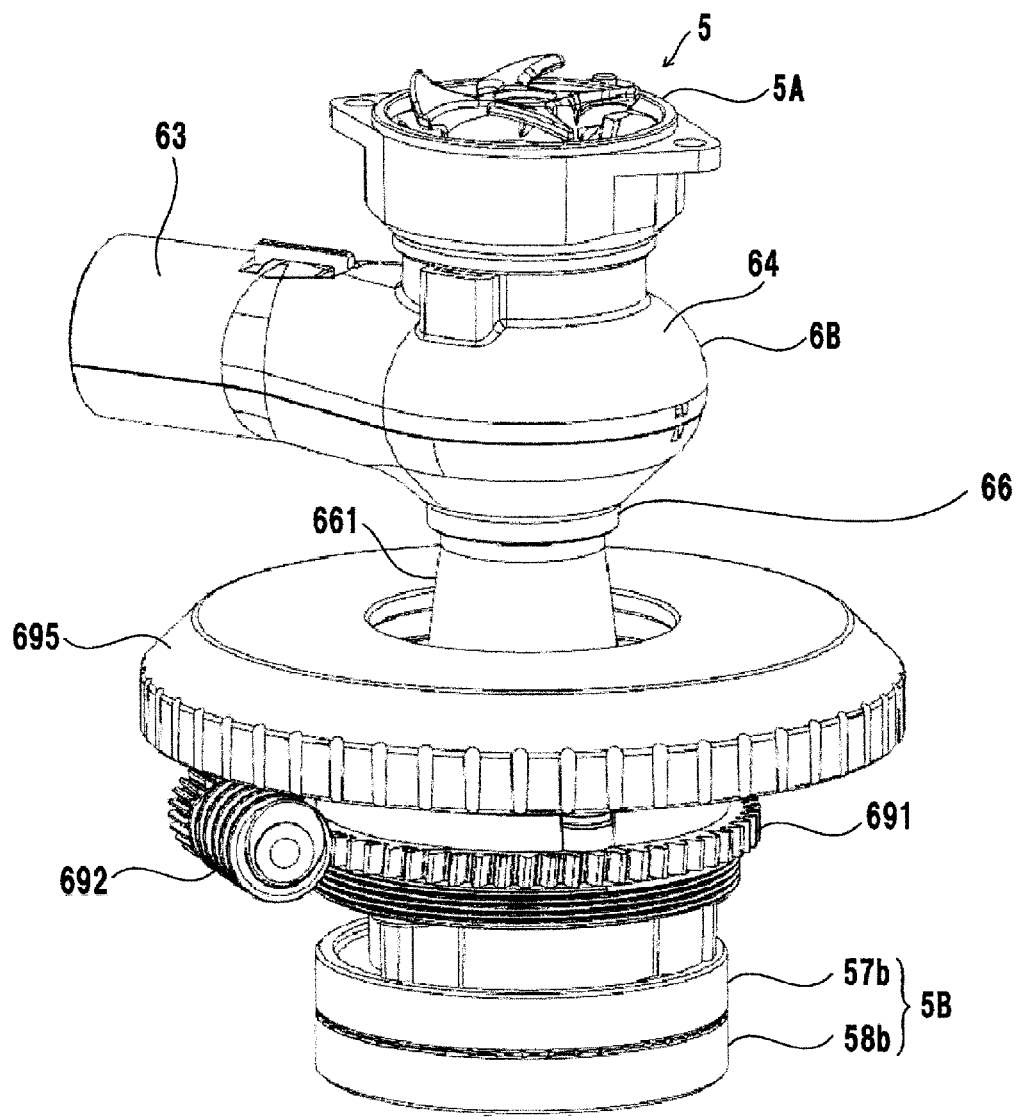

[Figure 4]
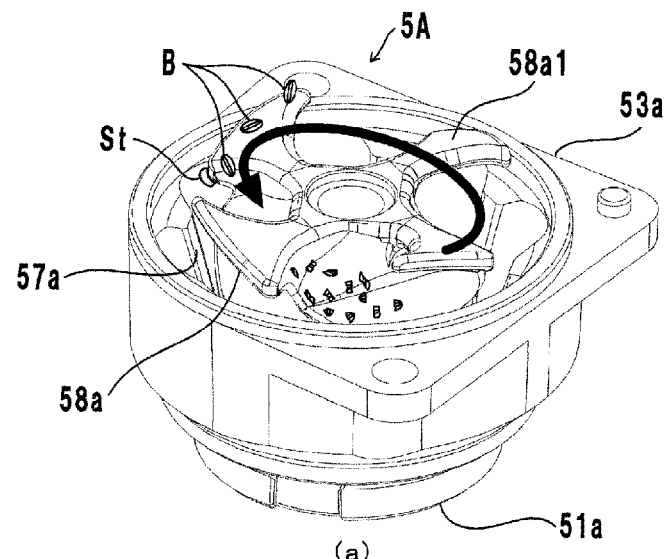
(a)
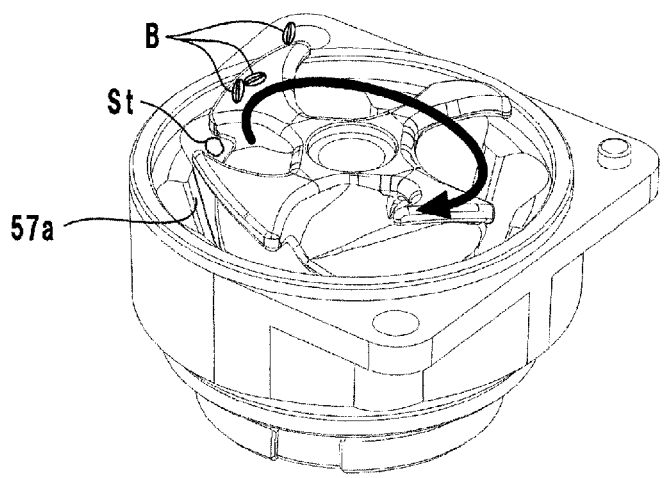
(b)
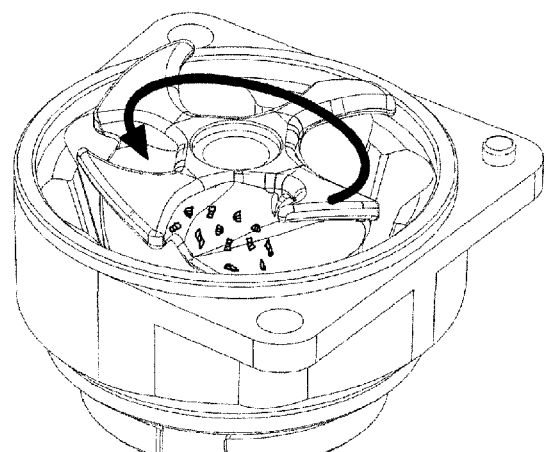
(c)

[Figure 5]
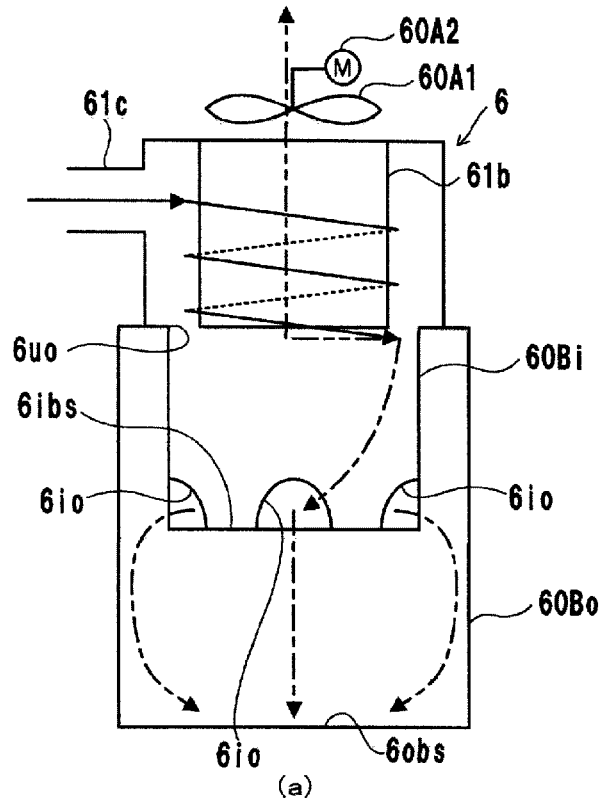
(a)
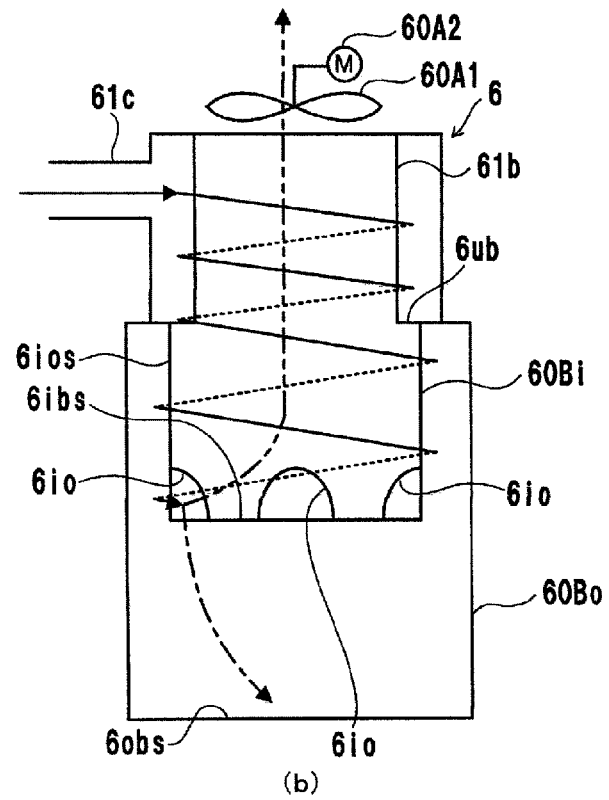
(b)

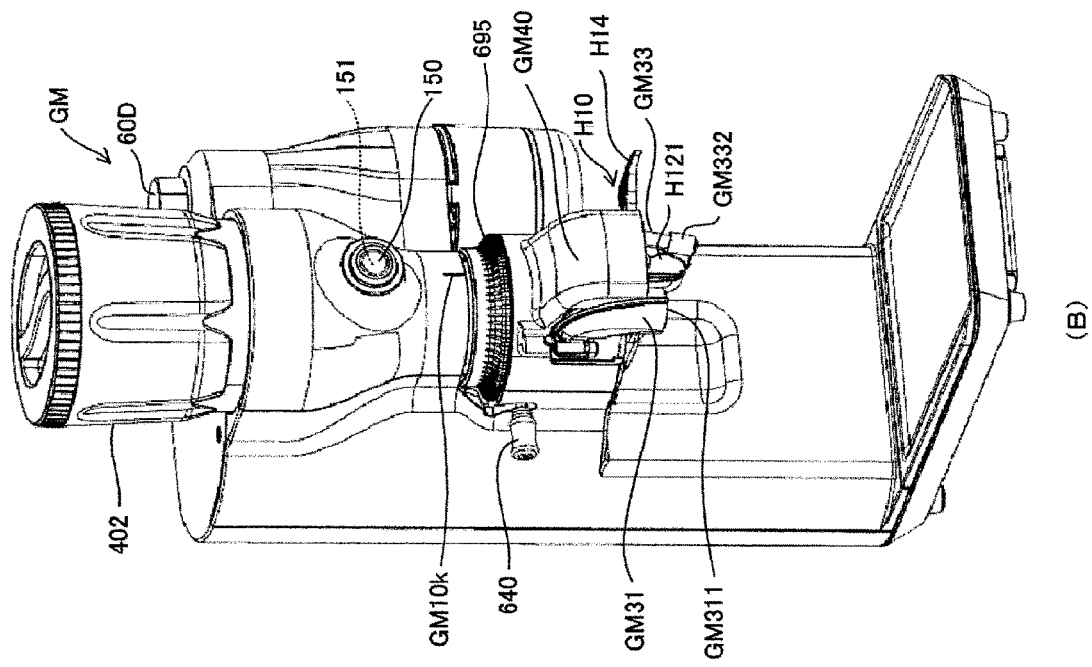
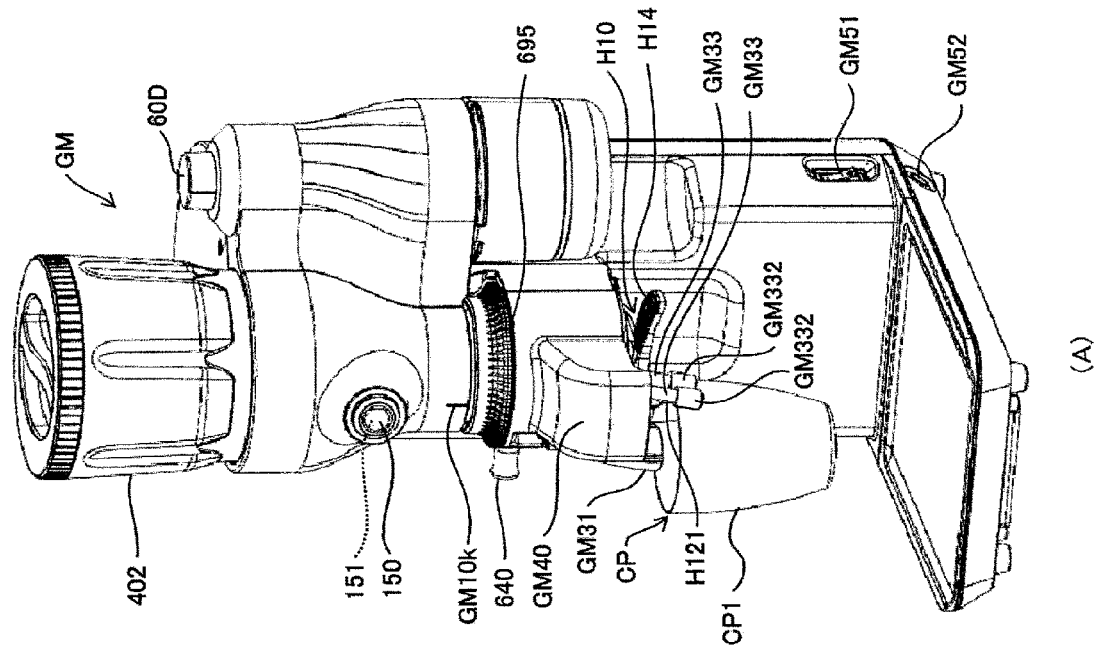

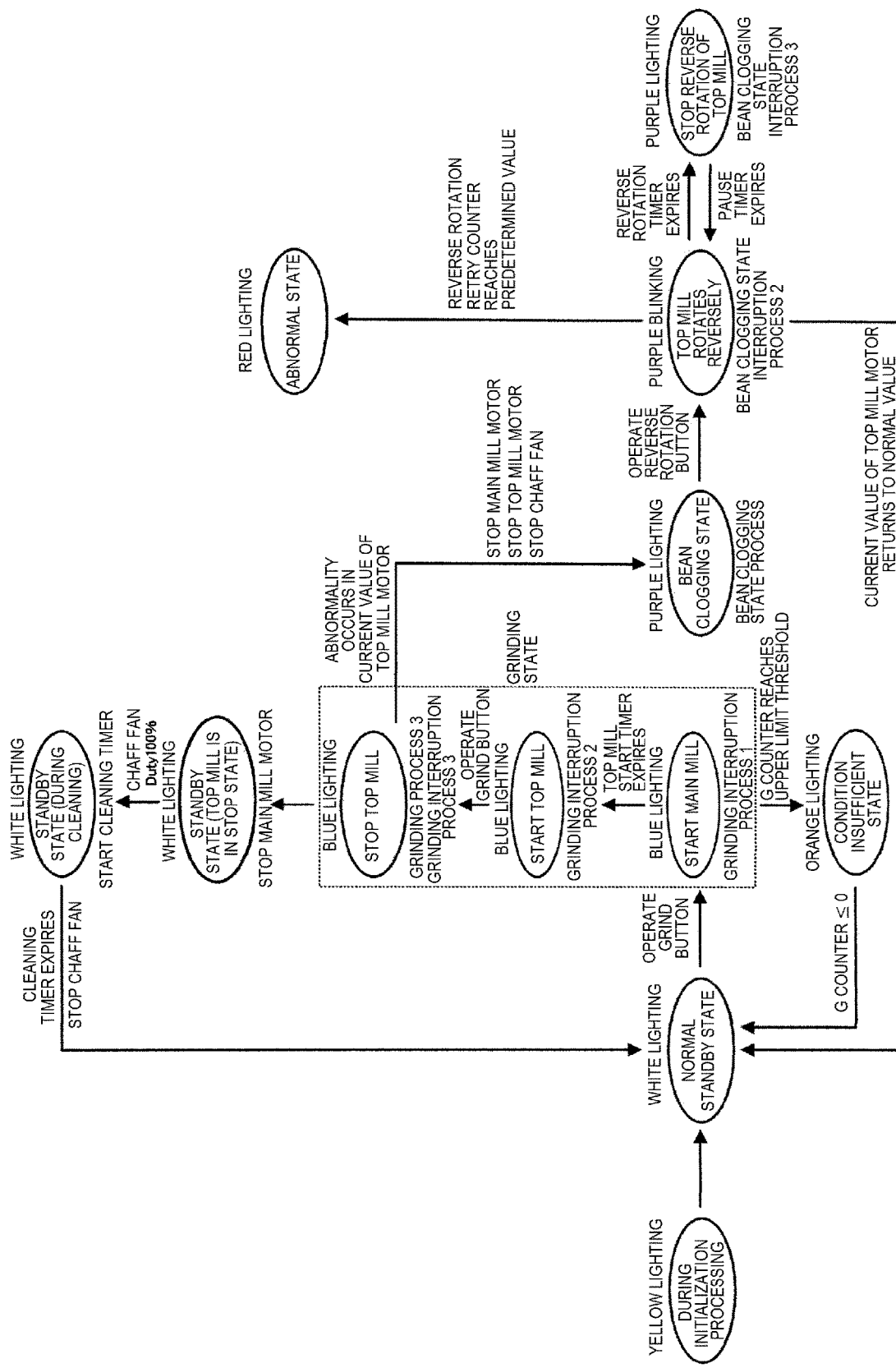
[Figure 7]

[Figure 8]
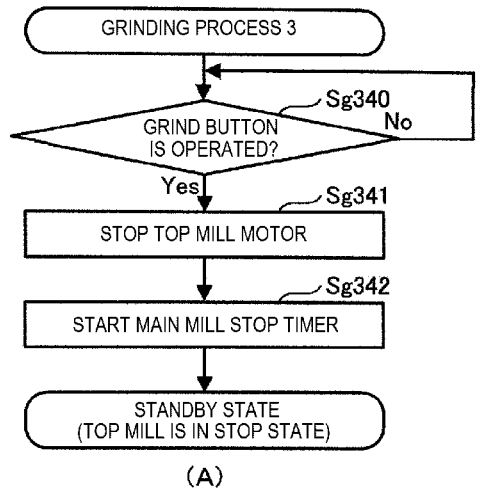
(A)
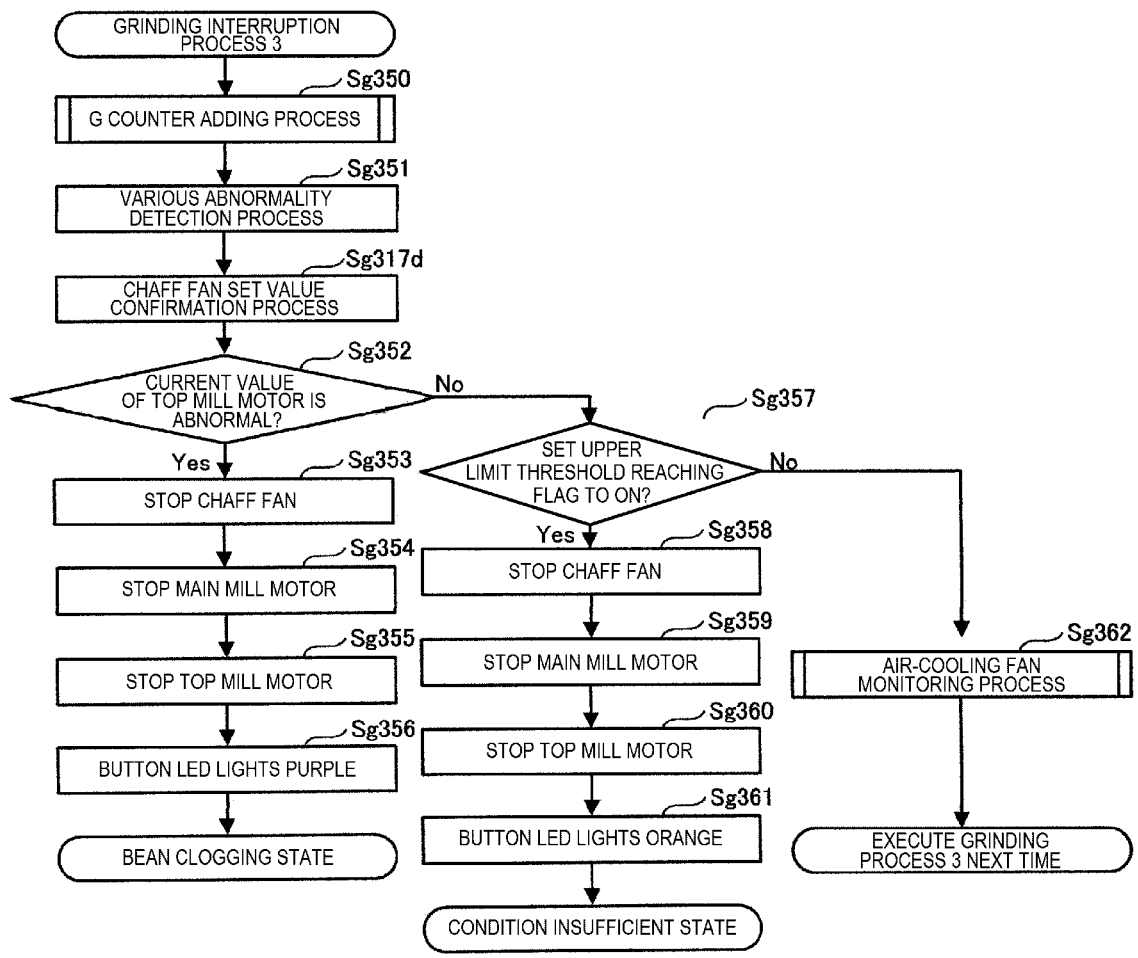
(B)

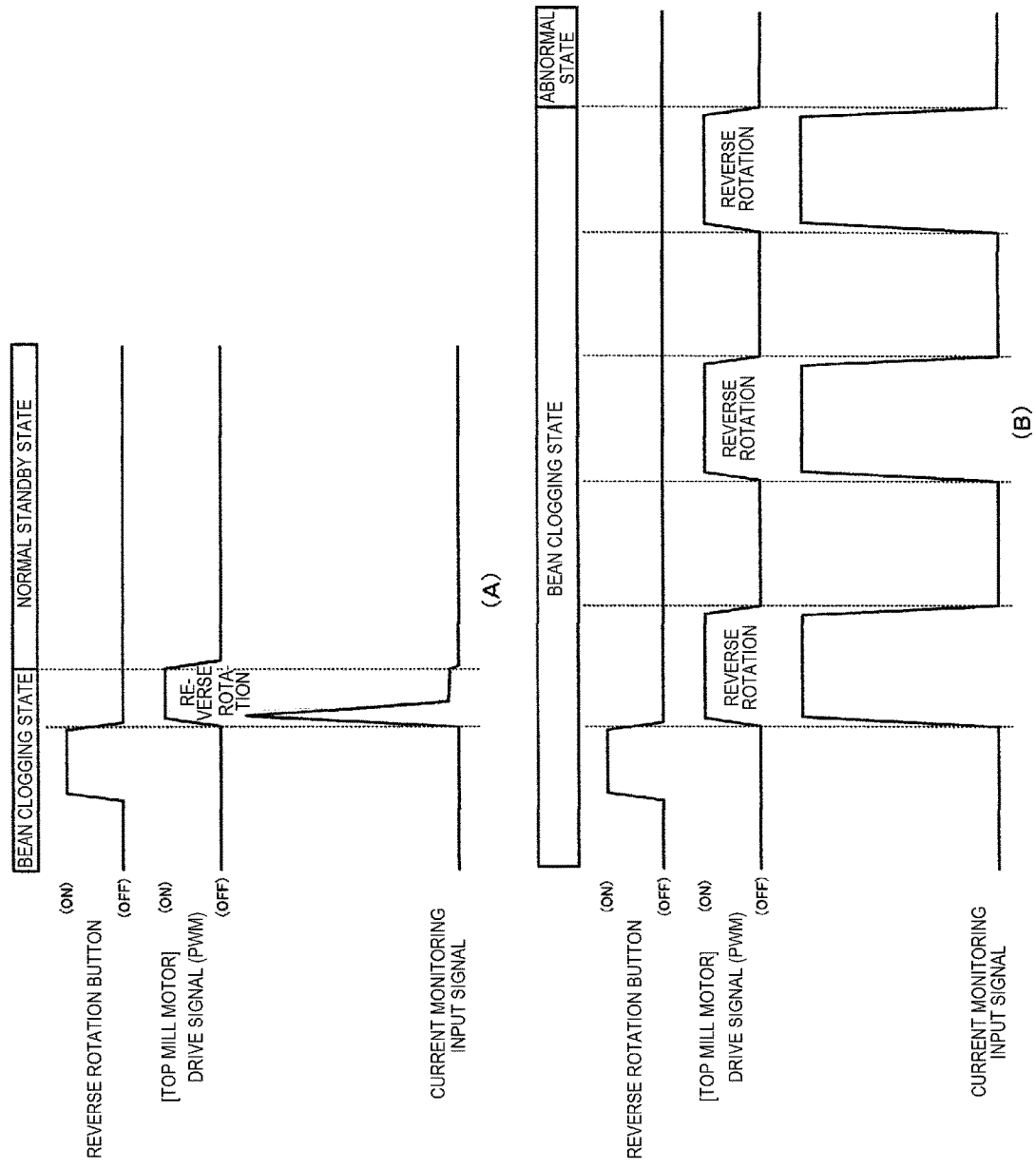
[Figure 9]

[Figure 10]
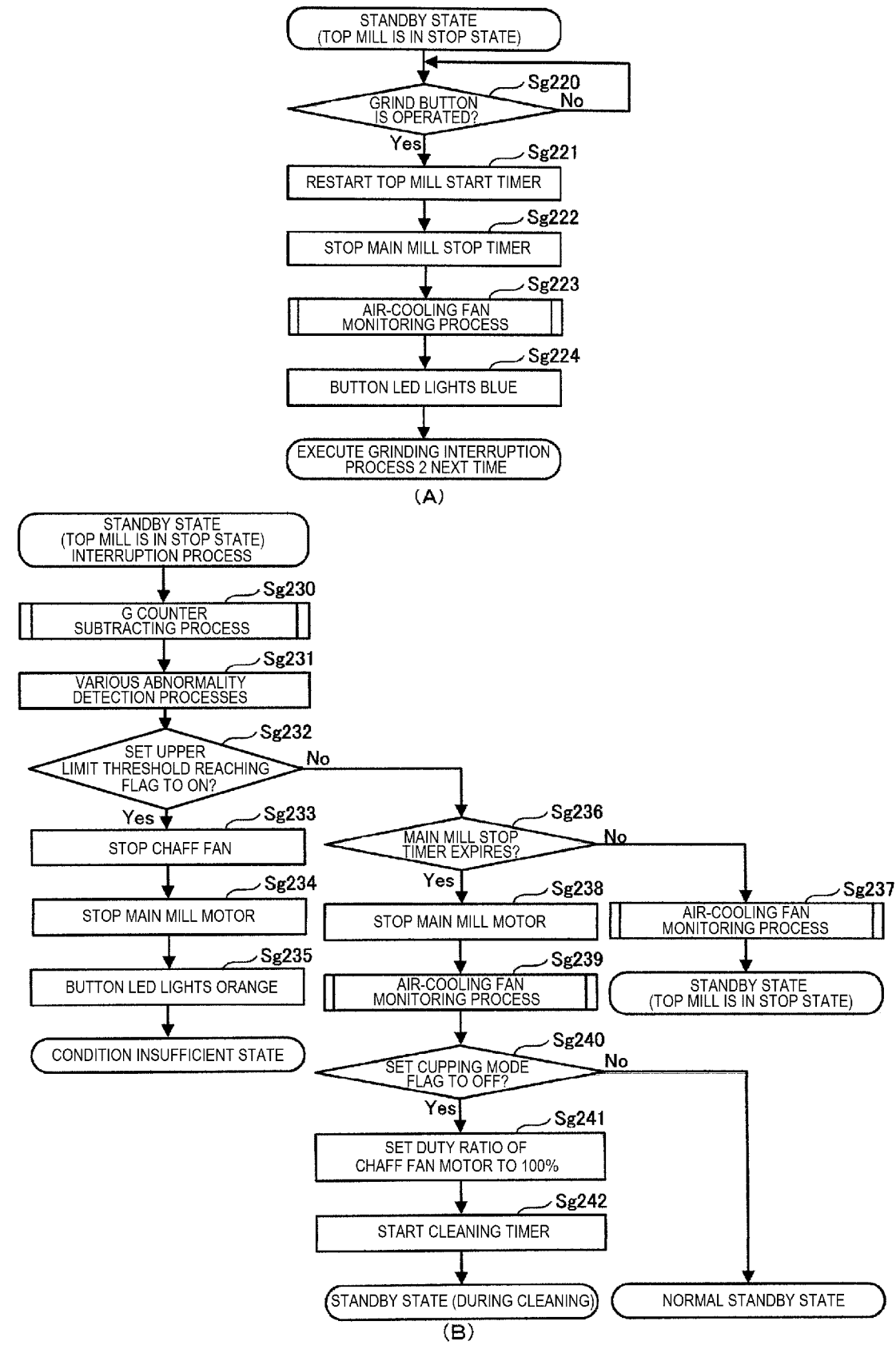

[Figure 11]
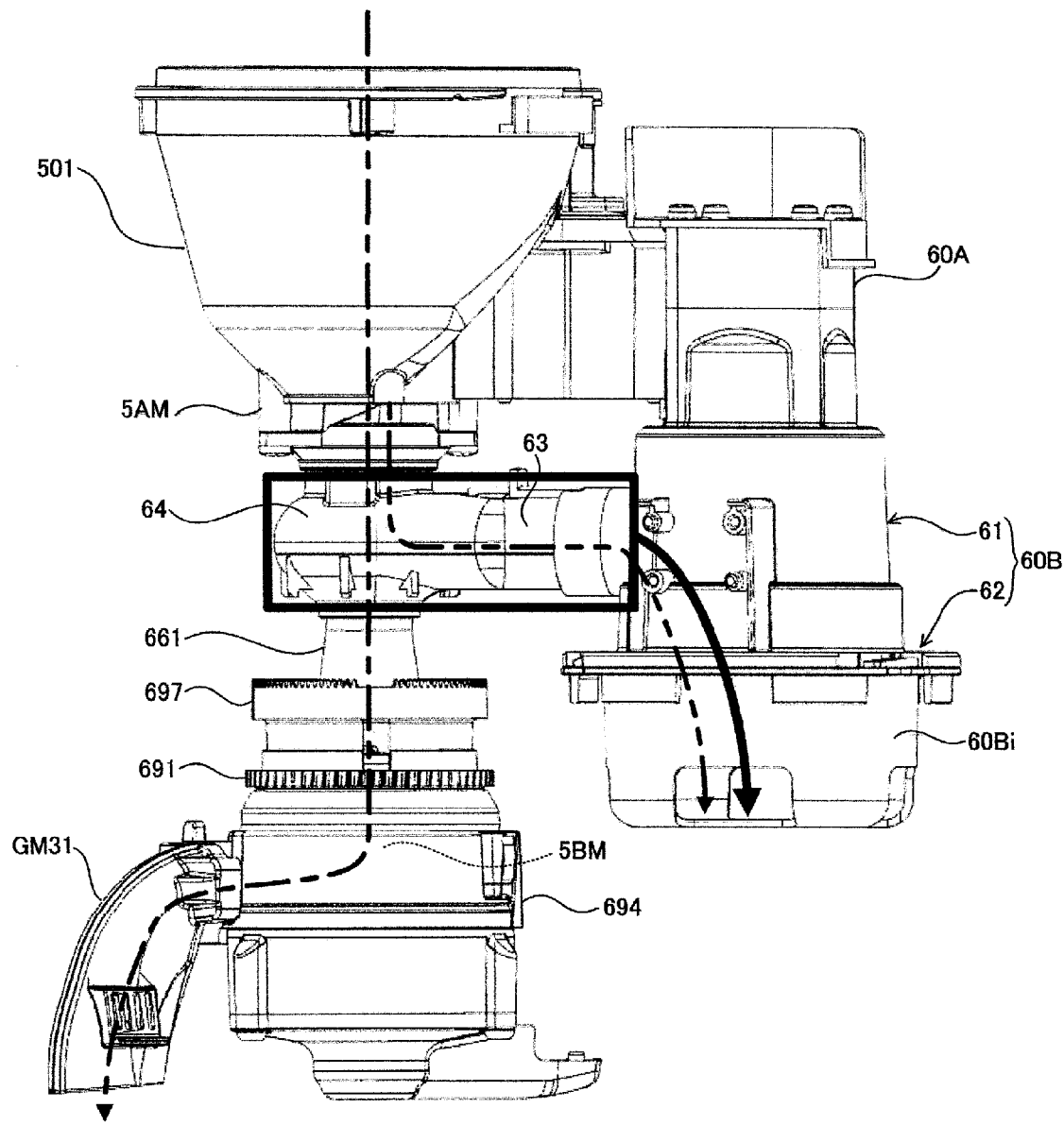

[Figure 12]
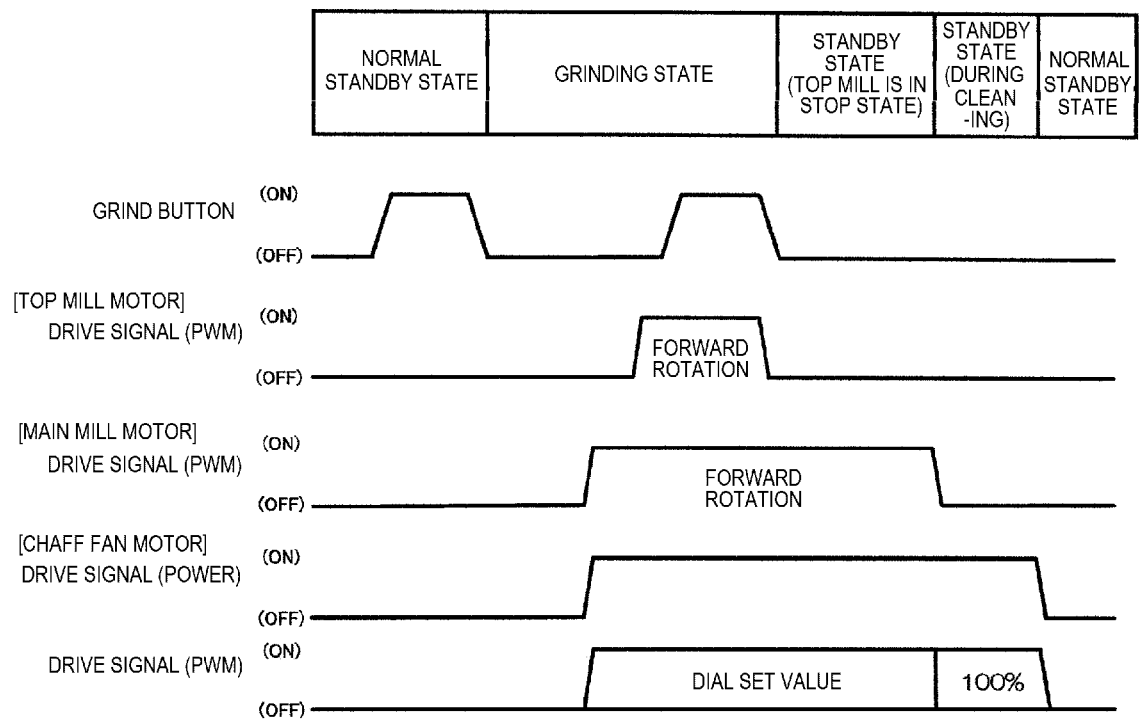

COFFEE MACHINE

TECHNICAL FIELD

The present invention relates to a coffee machine including a grinder for grinding coffee beans.

BACKGROUND ART

A coffee machine that performs adjustment using coffee beans has been proposed (for example, Patent Literature 1). The coffee machine proposed in Patent Literature 1 is equipped with a coffee bean grinding mechanism (grinder) and a coffee beverage extraction mechanism. Coffee machines equipped with only a grinder are known.

A grinder may fall into an abnormal state in which a predetermined rotation operation cannot be performed from a normal state in which the predetermined rotation operation is performed.

CITATION LIST

Patent Literature

Japanese Patent Laid-Open No. 2019-30433

SUMMARY OF INVENTION

Technical Problem

Therefore, it is desirable to return the grinder that falls into the abnormal state to the normal state.

In view of the above circumstances, an object of the present invention is to provide a coffee machine made to return a grinder falling into an abnormal state to a normal state.

Solution to Problem

A coffee machine of the present invention that achieves the above object includes:
  a grinder configured to grind coffee beans by a predetermined rotation operation in a normal state; and
  an operation portion, in which
  when the grinder is in an abnormal state in which the predetermined rotation operation cannot be performed, if the operation portion is operated, a reverse rotation operation is executed in a direction opposite to that of the predetermined rotation operation, and in the normal state, the reverse rotation operation is not executed even if the operation portion is operated.

According to the coffee machine, even when the operation portion is erroneously operated in the normal state, the reverse rotation operation is not executed, and a grinding process performed by the grinder is not adversely affected. On the other hand, in the abnormal state, the reverse rotation operation is executed in accordance with the operation of the operation portion, and the abnormal state may be resolved.

When the grinder is in the abnormal state in which the predetermined rotation operation cannot be performed, the operation portion is operated to cause the grinder to perform the reverse rotation operation in the direction opposite to the predetermined rotation operation.

A detection unit configured to detect that the grinder is in the abnormal state is provided, and the operation portion may cause the grinder to perform the reverse rotation operation by being operated only when the detection unit detects the abnormal state.

The detection unit may detect the abnormal state based on a current value flowing through a drive unit configured to cause the predetermined rotation operation to be performed, and more specifically, may detect the abnormal state when the current value is equal to or greater than a predetermined value [for example, 3 A].

When the grinder returns to the normal state, the grinder may not execute the reverse rotation operation even if the operation portion is operated. That is, when the grinder returns to the normal state, the operation portion may prevent the grinder from performing the reverse rotation operation even if the operation portion is operated.

The present invention may be the coffee machine including:
  a mode shift control unit configured to control mode shift of the machine [for example, a processing unit 11a in a normal standby state] is provided, in which
  the mode shift control unit shifts to one mode from a plurality of types of modes [for example, normal mode and cupping mode], and
  even when the abnormal state occurs in any one of the plurality of modes, the grinder executes the reverse rotation operation if the operation portion is operated.
  It is not a matter that the abnormal state occurs or does not occur due to the plurality of modes, and the plurality of modes and the occurrence of the abnormal state are irrelevant, and thus, even when the abnormal state occurs in any one of the plurality of modes, the grinder executes the reverse rotation operation if the operation portion is operated.

The plurality of types of modes may be operation modes of the machine, and the plurality of types of modes include, for example, a first mode (normal mode) in which waste is separated from ground beans, and a second mode (cupping mode) in which the waste is not separated from the ground beans.

The present invention may be the coffee machine, in which the plurality of types of modes include the normal mode in which the waste [such as chaff] is allowed to be separated from the ground beans ground by the grinder, and the cupping mode in which the waste is not separated from the ground beans ground by the grinder.

The present invention may be the coffee machine, in which when the grinder returns from the abnormal state [for example, bean clogging state] to the normal state [for example, normal standby state], the mode shift control unit maintains the mode before the grinder enters the abnormal state.

Similarly, it is not a matter that the abnormal state occurs or does not occur due to the plurality of modes, and the plurality of modes and the occurrence of the abnormal state are irrelevant, and thus, when the grinder returns from the abnormal state to the normal state, the mode shift control unit maintains the mode before the grinder enters the abnormal state.

When the grinder returns from the abnormal state to the normal state, the mode shift control unit may be capable of performing mode shift [for example, switching between the normal mode and the cupping mode by operating a reverse rotation button GM52].

The present invention may be the coffee machine, in which the grinder stops a rotation operation when the state does not return to the normal state even after repeating the reverse rotation operation a predetermined number of times [for example, three times] in the abnormal state [for example, (B) of FIG. 9].

If the abnormal state is not resolved even after the reverse rotation operation is performed the predetermined number of times, the resolving of the abnormal state performed by the reverse rotation operation is given up, and further a load on the grinder can be reduced.

In the abnormal state, the grinder may perform the reverse rotation operation if the operation portion is operated, or may not perform the reverse rotation operation even if the operation portion is operated.

Advantageous Effects of Invention

According to the present invention, it is possible to provide a coffee machine made to return a grinder falling into an abnormal state to a normal state.

BRIEF DESCRIPTION OF DRAWINGS

FIG. 1 is an external perspective view of a coffee bean grinding machine.

FIG. 2 is a block diagram of a control device of the coffee bean grinding machine.

FIG. 3 is a diagram showing a main configuration of a pulverizing device 5 incorporated in a coffee bean grinding machine GM.

FIG. 4 is a perspective view of a first grinder 5A.

FIG. 5 (a) of FIG. 5 is a diagram schematically showing a phenomenon such as a flow of air in a separation device 6, and (b) of FIG. 5 is a diagram schematically showing a phenomenon such as a flow of air in a separation device according to a modification.

FIG. 6 shows perspective views of a coffee bean grinding machine according to a second embodiment.

FIG. 7 is a transition diagram of operating states in a coffee bean grinding machine GM according to the second embodiment.

FIG. 8 (A) of FIG. 8 is a flowchart showing a flow of a grinding process 3 executed by a processing unit 11a in a grinding state, and (B) of FIG. 8 is a flowchart showing a flow of a grinding interruption process 3 executed by the processing unit 11a in the grinding state.

FIG. 9 (A) of FIG. 9 is a diagram showing an example in which a bean clogging state is eliminated, and (B) of FIG. 9 is a diagram showing an example in which a current value of a top mill motor does not decrease to a clogging clearing current value even when a drive signal for reversely rotating the top mill motor is output three times with time intervals.

FIG. 10 (A) of FIG. 10 is a flowchart showing a flow of a standby state (a top mill is in a stop state) process executed by the processing unit 11a in the standby state (the top mill is in the stop state), and (B) of FIG. 10 is a flowchart showing a flow of the standby state (the top mill is in the stop state) interruption process executed by the processing unit 11a in the standby state (top mill is in the stop state).

FIG. 11 is a diagram showing a path for coffee beans, a path for waste such as chaff, and a path for after-cleaning.

FIG. 12 is a diagram showing an example in which the waste such as chaff is aspirated while a top mill 5AM is rotating, and the after-cleaning is performed by a stronger aspiration without stopping the aspiration even if the top mill 5AM stops.

DESCRIPTION OF EMBODIMENTS

An embodiment of the present invention will be described with reference to the drawings.

FIG. 1 is an external perspective view of a coffee bean grinding machine, and FIG. 2 is a block diagram of a control device of the coffee bean grinding machine.

A coffee bean grinding machine GM shown in FIG. 1 includes a reservoir device 4, a pulverizing device 5, and a control device 11 shown in FIG. 2 to control the reservoir device 4 and the pulverizing device 5. The coffee bean grinding machine GM also includes an information display device 12 (see FIG. 2) wirelessly connected to the control device 11. The information display device 12 is a touch panel type display for inputting various control instructions, set values, and the like of the coffee bean grinding machine GM, and can receive input from an administrator or a user in addition to displaying various kinds of information. The information display device 12 is provided with a speaker and a camera.

The control device 11 controls the entire coffee bean grinding machine GM. The control device 11 includes a processing unit 11a, a storage unit 11b, and an interface (I/F) unit 11c. The processing unit 11a is, for example, a processor such as a CPU. The storage unit 11b is, for example, a RAM or a ROM. A recipe is stored in the storage unit 11b. The recipe includes information on various conditions for grinding coffee beans, beans information, recipe creator information, comments of a recipe creator, and the like. The I/F unit 11c includes an input and output interface that inputs and outputs a signal between an external device and the processing unit 11a. The I/F unit 11c also includes a communication interface capable of performing data communication with an external terminal such as a server 16 or a mobile terminal 17 via a communication network 15 such as the Internet. The server 16 can communicate with the mobile terminal 17 such as a smartphone via the communication network 15, and can receive, for example, information such as a reservation for production of ground beans of coffee and an impression from the mobile terminal 17 of a consumer. A coffee bean grinding system GS that grinds the coffee beans includes the coffee bean grinding machine GM, the server 16, and the mobile terminal 17.

The processing unit 11a executes a program stored in the storage unit 11b, and controls the reservoir device 4 and the pulverizing device 5 in accordance with the recipe. More specifically, the processing unit 11a controls an actuator group 14 in accordance with the recipe, and controls the actuator group 14 based on an instruction from the information display device 12, a detection result of a sensor group 13, or an instruction from the server 16. The sensor group 13 includes various sensors (for example, operation position detection sensors and the like of a mechanism) provided in the reservoir device 4 and the pulverizing device 5. The actuator group 14 includes various actuators (for example, motors) provided in the reservoir device 4 and the pulverizing device 5.

The reservoir device 4 shown in FIG. 1 includes a cylindrical canister accommodation unit 401 and a detachable cap 401c that is screwed to an upper end portion of the canister accommodation unit 401 and covers an upper surface of the canister accommodation unit 401. A canister accommodation chamber (not shown) is provided inside the canister accommodation unit 401. A plurality of canister accommodation chambers are provided in a circumferential direction, and a plurality of canisters can be accommodated inside the canister accommodation unit 401. The plurality of canisters accommodated in the reservoir device 4 can be selectively used. Therefore, it is possible to select roasted coffee beans of different varieties or roasted coffee beans having different degrees of roasting and perform a grinding process, and it is also possible to mix a plurality of varieties of roasted coffee beans having different degrees of roasting and perform the grinding process.

The canister accommodation unit 401 is detachably attached to an option attachment portion GM11 provided in an upper portion of a center casing GM10 of the coffee bean grinding machine GM. In addition to the canister accommodation unit 401, a plurality of types of units can be attached to the option attachment portion GM11. The upper portion of the center casing GM10 covers a lower portion of a unit attached to the option attachment portion GM11. A type of the unit attached to the option attachment portion GM11 may be displayed on the external terminal such as the mobile terminal 17 capable of communicating with the coffee bean grinding machine GM.

The pulverizing device 5 includes a first grinder 5A, a second grinder 5B, and a separation device 6. The first grinder 5A and the second grinder 5B are mechanisms that grind the roasted coffee beans. The roasted coffee beans are ground by the first grinder 5A, and then further ground by the second grinder 5B into powder. That is, the first grinder 5A and the second grinder 5B are different in a ground particle size of beans. The first grinder 5A is a grinder for coarse grinding, and the second grinder 5B is a grinder for fine grinding. Each of the first grinder 5A and the second grinder 5B is an electric grinder, and includes a motor as a drive source, a rotary blade driven by the motor, and the like. A size (particle size) of the roasted coffee beans to be pulverized can be changed by changing the number of rotations of the rotary blade. The separation device 6 is a mechanism that separates waste such as chaff and fine powder from the ground beans.

The ground beans ground by the second grinder 5B are discharged from a chute GM31 shown in FIG. 1.

The chute GM31 shown in FIG. 1 guides the ground beans delivered in a substantially horizontal direction downward. The coffee bean grinding machine GM shown in FIG. 1 is provided with a hammer member GM32 that strikes the chute GM31. The hammer member GM32 pivots about a pivot shaft GM321 extending in an upper-lower direction. The ground beans delivered in the substantially horizontal direction may collide with and adhere to an inner wall of the chute GM31. The user pivots the hammer member GM32 to strike the chute GM31, and applies an impact to the adhered ground beans to cause the ground beans to fall.

FIG. 3 is a diagram showing a main configuration of the pulverizing device 5 incorporated in the coffee bean grinding machine GM.

In FIG. 3, the first grinder 5A, a forming unit 6B, and the second grinder 5B are arranged from an upstream side. That is, the forming unit 6B is provided downstream of the first grinder 5A and upstream of the second grinder 5B. The first grinder 5A and the second grinder 5B are mechanisms that grind the roasted coffee beans supplied from a reservoir unit such as the canister accommodation unit 401, a hopper unit 402, or a funnel unit 403.

An upper end of a coupling duct 661 is connected to a discharge port 66 of the forming unit 6B. In FIG. 3, a lower side portion of the coupling duct 661 is obscured by a manual setting disc dial 695.

FIG. 3 shows a fixed blade 57b disposed on an upper side and a rotary blade 58b disposed on a lower side, which constitute the second grinder 5B.

The fixed blade 57b can be moved up and down with respect to the rotary blade 58b, and the particle size of the ground beans can be adjusted by adjusting a distance between the rotary blade 58b and the fixed blade 57b. FIG. 3 also shows a worm wheel 691 and a worm gear 692 meshing with the worm wheel 691 as part of a lifting mechanism for the fixed blade 57b.

The first grinder 5A will be described.

FIG. 4 is a perspective view of the first grinder 5A.

The first grinder 5A shown in FIG. 4 is a grinder for crushing the coffee beans to a certain size (for example, about ¼) in order to facilitate separation of the waste adhering to the coffee beans. A rotation shaft (not shown in FIG. 4) extends from above, and a rotary blade 58a as a cutter is provided on the rotation shaft. A fixed blade 57a, which is a cutter, is provided around the rotary blade 58a. The fixed blade 57a shown in FIG. 4 is provided on an inner peripheral surface of a main body portion 53a. The rotation shaft is rotated by a first motor (not shown) to rotate the rotary blade 58a.

The roasted coffee beans introduced into a bean transport path provided inside the center casing GM10 shown in FIG. 1 arrive the first grinder 5A.

The roasted coffee beans that arrive the first grinder 5A are guided by an upper surface 58a1 of the rotating rotary blade 58a and directed toward the fixed blade 57a by a centrifugal force, or are directed toward the fixed blade 57a without being guided by the upper surface 58a1 of the rotary blade 58a, and is sandwiched between the fixed blade 57a and the rotating rotary blade 58a to be pulverized. The pulverized ground beans are discharged from a discharge port 51a (see (a) of FIG. 4) to the forming unit 6B.

Although rare, roasted coffee beans B that arrive the first grinder 5A may sometimes contain foreign substances harder than the roasted coffee beans B, such as stones and nails. Such foreign substances cannot be ground between the fixed blade 57a and the rotary blade 58a, and the rotary blade 58a cannot rotate normally if the foreign substances are sandwiched between the blades.

In (a) of FIG. 4, a stone St is sandwiched between the fixed blade 57a and the rotary blade 58a, preventing the rotary blade 58a from rotating normally. That is, the rotation is stopped or a rotation speed is significantly slowed down. The processing unit 11a shown in FIG. 2 monitors a current value flowing through the first motor. When the rotary blade 58a cannot normally rotate forward, the current value becomes an abnormal value (a value exceeding a reference value). The processing unit 11a determines whether the current value is an abnormal value, and if the processing unit 11a determines that the current value is an abnormal value, the first motor is rotated reversely, and the rotary blade 58a starts to reversely rotate.

In (b) of FIG. 4, the first motor starts to rotate reversely, and the stone St sandwiched between the fixed blade 57a and the rotary blade 58a falls. In addition to the current value, the processing unit 11a may monitor a rotational torque and determine whether a value of the rotational torque is an abnormal value. Alternatively, the processing unit 11a may monitor the number of rotations and a rotation speed of the rotary blade 58a instead of monitoring the first motor, and determine whether these values are abnormal values.

(c) of FIG. 4 shows a state in which the rotation of the first motor returns to forward rotation and the roasted coffee beans B are normally pulverized. The reverse rotation of the first motor shown in (b) of FIG. 4 is instantaneous, and the return to the forward rotation is performed immediately. The reverse rotation of the first motor may be continued for a certain time. For example, the reverse rotation of the first motor may be continued while an abnormality is being notified, and when the rotation returns to the forward rotation, an error resolution notification "the bean clogging error has been resolved" may be output.

The falling stone St in (b) of FIG. 4 arrives the second grinder 5B. Since the second grinder 5B is the grinder for fine grinding, a gap between the fixed blade 57b and the rotary blade 58b is narrow, and a possibility of entering the gap is low, and the stone remains on the fixed blade 57b. The stone St is removed when maintenance of the pulverizing device 5 is performed.

As described above, the reverse rotation of the first motor is performed during the grinding process of the first grinder 5A executed by the processing unit 11a, and an instruction to start the reverse rotation of the first motor may be output from the external terminal such as the mobile terminal 17 shown in FIG. 2. Alternatively, an instruction to stop the rotation of the first motor may be output from the external terminal. Furthermore, an instruction to stop the operation of the entire coffee bean grinding machine GM may be output from the external terminal. The processing unit 11a controls the actuator group 14 according to such instructions from the external terminal.

In the description using FIG. 4, a case where a stone is sandwiched between the fixed blade 57a and the rotary blade 58a is an example, but depending on the case, a case where very hard degraded roasted coffee beans are sandwiched is also present, the grinding process of the first grinder 5A can be continued by performing a reverse rotation control. Damages to the first motor, the fixed blade 57a, and the rotary blade 58a are avoided.

A reverse rotation button that rotates the first motor reversely is provided in advance, and when an abnormal value is detected, the abnormality notification is instructed in step S15 without performing the reverse rotation control in step S14, and the reverse rotation of the first motor may be performed by the user of the coffee bean grinding machine GM in a manner of operating the reverse rotation button.

The grinding process of the first grinder 5A described above can also be applied to a grinding process of the second grinder 5B.

(a) of FIG. 5 is a diagram schematically showing a phenomenon such as a flow of air in the separation device 6. In (a) of FIG. 5 and (b) of the same which will be described later, the flow of the air containing the waste such as chaff and fine powder is indicated by solid and dotted arrows, movement of the waste is indicated by one-dot chain line arrows, and the flow of the air from which the waste is separated is indicated by two-dot chain line arrows.

When the chaff fan 60A1 is rotationally driven by a chaff fan motor 60A2, the air containing the waste such as chaff and fine powder arrives through a connection portion 61c from a separation chamber in the forming unit 6B shown in FIG. 3. The connection portion 61c is open to a side of an exhaust pipe 61b, the air containing the waste swirls around the exhaust pipe 61b as indicated by the solid and dotted arrows in (a) of FIG. 5, and eventually enters an inner case 60Bi from an upper end opening 6uo of the inner case 60Bi. In an upper part in the inner case 60Bi, the waste such as chaff and fine powder falls due to its own weight (see the one-dot chain line arrow), further fall into an outer case 60Bo from a plurality of openings 6io provided in the vicinity of a bottom surface 6ibs of the inner case 60Bi (see the one-dot chain line arrows), and accumulate on a bottom surface 6obs of the outer case 60Bo. The air obtained by the falling of the waste in the inner case 60Bi and the separation of the waste becomes an upward air current from the inner case 60Bi as indicated by the two-dot chain line arrow, rises along a central axis of the exhaust pipe 61b, and is exhausted to the outside of the coffee bean grinding machine GM through an exhaust slit (not shown) provided on a back side of a casing 60C shown in FIG. 1. As a result, the case (outer case 60Bo) on which the waste such as chaff and fine powder is accumulated differs from the case (inner case 60Bi) in which an upward air current is generated, and the waste is less likely to rise up, and backflow of the waste is reduced.

Both the outer case 60Bo and the inner case 60Bi are entirely transparent, so that a state inside can be confirmed from the outside. Therefore, an accumulated state of the waste such as chaff and fine powder and the flow of the air current from the outside can be confirmed. The cases may not be wholly transparent, but may be partially transparent, and may be translucent instead of transparent.

(b) of FIG. 5 is a diagram schematically showing a phenomenon such as a flow of air in a separation device according to a modification.

In the modification, an upper end of the inner case 60Bi is not open and is covered with a doughnut-shaped top plate 6ub. The air that swirls around the exhaust pipe 61b and contains the waste such as chaff and fine powder continues to swirl along an outer peripheral surface 6ios of the inner case 60Bi, and is directed toward the bottom surface 6ibs of the inner case 60Bi (see the solid and dotted arrows). Eventually, the air enters the inner case 60Bi through the plurality of openings 6io provided in the vicinity of the bottom surface 6ibs of the inner case 60Bi. In this case, the waste such as chaff and fine powder falls due to its own weight (see the one-dot chain line arrow), and accumulates on the bottom surface 6obs of the outer case 60Bo. The air obtained by the falling of the waste and the separation of the waste becomes an upward air current in the inner case 60Bi as indicated by the two-dot chain line arrow, rises along a central axis of the inner case 60, is directed upward through an inner side of the exhaust pipe 61b, and is exhausted to the outside of the coffee bean grinding machine GM through the exhaust slit (not shown) provided on the back side of the casing 60C shown in FIG. 1. Also in the modification, the case (outer case 60Bo) on which the waste such as chaff and fine powder is accumulated differs from the case (inner case 60Bi) in which the upward air current is generated, and the waste is less likely to rise up, and the backflow of the waste is reduced.

Next, a coffee bean grinding machine according to a second embodiment will be described in a case where the coffee bean grinding machine shown in FIG. 1 is used as a coffee bean grinding machine according to a first embodiment. In the following description, components having the same names as those of the components described above are also denoted by the same reference numerals as those used above. Differences from the coffee bean grinding machine shown in FIG. 1 will be described, and a repetitive description will be omitted. The coffee bean grinding machine GM according to the second embodiment includes the pulverizing device 5 having the same structure as the pulverizing device 5 of the coffee bean grinding machine GM according to the first embodiment, and in a description of the second embodiment, the first grinder 5A is referred as a top mill 5AM, and the second grinder 5B is referred to as a main mill 5BM. In addition, a motor that causes the top mill 5AM to rotate is referred to as a top mill motor (corresponding to the first motor), and a motor that causes the main mill 5BM to rotate is referred to as a main mill motor.

FIG. 6 shows perspective views of the coffee bean grinding machine according to the second embodiment. (A) of FIG. 6 is the perspective view of the coffee bean grinding machine GM in a state of holding a cup CP when viewed obliquely from the front left of the machine, that is, from the front right when viewed from an operator, and (B) of FIG. 6 is the perspective view of the coffee bean grinding machine GM from which the cup CP is removed when viewed obliquely from the front right of the machine, that is, from the front left when viewed from the operator.

First, a plurality of operating states of the coffee bean grinding machine GM according to the second embodiment will be described, and a control process in each operating state will be described in detail.

FIG. 7 is a transition diagram of operating states in the coffee bean grinding machine GM according to the second embodiment.

In the coffee bean grinding machine GM according to the second embodiment, there are the plurality of operating states such as a state during initialization processing, a normal standby state, a grinding state, a standby state (the top mill is in the stop state), a standby state (during cleaning), a condition insufficient state, a bean clogging state, and an abnormal state. The normal standby state is an operable state and corresponds to a basic state of the coffee bean grinding machine GM according to the second embodiment. In the coffee bean grinding machine GM, the various operating states are notified by changing emission colors of a button LED 151 incorporated in a grind button 150 shown in FIG. 6. The state during the initialization processing is indicated by yellow lighting, the normal standby state, the standby state (the top mill 5AM is in the stop state), and the standby state (during cleaning) are indicated by white lighting, the grinding state is indicated by blue lighting, the condition insufficient state is indicated by orange lighting, the bean clogging state is indicated by purple lighting, and the abnormal state is indicated by red lighting. The white lighting is limited to a normal mode which will be described later.

In the normal standby state, the processing unit 11a monitors an operation of the grind button 150 shown in FIG. 6 and an operation of a reverse rotation button GM52. When the grind button 150 is operated, the main mill motor is started after a predetermined time (for example, 30 ms) has passed, and the button LED 151 lights blue. Also, an air-cooling fan (not shown) that cools the main mill motor is started in advance before the starting of the main mill motor. When the reverse rotation button GM52 is operated, it is determined whether a cupping mode flag is set to ON. The coffee bean grinding machine GM according to the second embodiment includes a normal mode and a cupping mode as operation modes. The cupping mode is a mode in which the chaff fan 60A1 shown in FIG. 5 does not rotate and chaff separation is not performed, and the normal mode is a mode in which the chaff fan 60A1 can rotate to perform the chaff separation. In cupping, since the coffee beans themselves are evaluated, the chaff cannot be removed, and thus, the cupping mode is provided. The reverse rotation button GM52 functions here as a toggle switch that switches between the normal mode and the cupping mode, and if the cupping mode flag is ON, the cupping mode flag is set to OFF, the mode is shifted to the normal mode, and the button LED 151 lights white. On the other hand, if the cupping mode flag is OFF, the cupping mode flag is set to ON, the mode is shifted to the cupping mode, and the button LED 151 lights green. When the grind button 150 is not operated, the normal standby state is continued, and the button LED 151 lights green in the normal standby state in the cupping mode.

(A) of FIG. 8 is a flowchart showing a flow of the grinding process 3 executed by the processing unit 11a in the grinding state shown in FIG. 7.

The grinding process 3 is not an interruption process, and the processing unit 11a repeatedly determines whether the grind button 150 has been operated until the grind button 150 shown in FIG. 6 is operated (step Sg340). The operation of the grind button 150 here is an operation of requesting to interrupt grinding, and when the grind button 150 is operated, the top mill motor is stopped (step Sg341). Next, a main mill stop timer is started (step Sg342), the grinding process 3 is ended, and the operating state of the machine shifts to the standby state (the top mill is in the stop state). The main mill stop timer counts (for example, counts 500 ms) until a stop timing of the main mill motor. In the grinding state, the top mill 5AM is stopped first, and then the main mill 5BM is stopped.

(B) of FIG. 8 is a flowchart showing a flow of the grinding interruption process 3 executed by the processing unit 11a in the grinding state.

The processing unit 11a starts the grinding interruption process 3 with a timer interrupt signal as a trigger. First, in step Sg350, a G counter adding process is executed. In the G counter adding process, first, it is determined whether an air-cooling fan abnormality flag is set to OFF. According to an air-cooling fan monitoring process which is executed separately, the air-cooling fan abnormality flag is a flag that is set to ON if an abnormality occurs in the air-cooling fan that cools the main mill motor, and is set to OFF if the air-cooling fan is normal. When the air-cooling fan abnormality flag is set to ON, a predetermined abnormal value (for example, 5 m (m is a natural number)) is added to a count value of a G counter. Next, an upper limit threshold determination is performed to determine whether the count value of the G counter reaches an upper limit threshold, and if the count value does not reach the upper limit threshold, the G counter adding process ends. On the other hand, if the count value of the G counter reaches the upper limit threshold, an upper limit threshold reaching flag is set to ON, and the G counter adding process ends. On the other hand, if the air-cooling fan abnormality flag is set to OFF, a predetermined normal value (for example, m) is added to the count value of the G counter, and the process proceeds to the upper limit threshold determination. An absolute value of the abnormal value is a value greater than an absolute value of the normal value.

Next, various abnormality detection processes (step Sg351) are executed. For example, when a RAM abnormality, a current value abnormality of the top mill motor at non-drive time, a current value abnormality of the main mill motor at the same non-drive time are detected, the button LED 151 lights red, and the operating state of the machine shifts to the abnormal state. Further, when there is undetection of the hopper unit 402 due to the hopper unit 402 shown in FIG. 51 not being attached, the button LED 151 lights orange, and the operating state of the machine shifts to the condition insufficient state. Furthermore, a chaff fan set value confirmation process (step Sg317d) is executed. In the chaff fan set value confirmation process, if a change is present in a definite value of a set value of the chaff fan 60A1, the chaff fan motor 60A2 is set to rotate with the changed definite value.

Subsequently, it is determined whether a current value of the top mill motor is an abnormal value (step Sg352). In the top mill 5AM, as described with reference to FIG. 4, foreign substances such as stones or extremely hard and deteriorated roasted coffee beans may be sandwiched between the fixed blade 57*a* and the rotary blade 58*a*. In this case, the current value of the top mill motor that causes the rotary blade 58*a* to rotate becomes an abnormal value.

(A) of FIG. 9 is a diagram showing an example in which the bean clogging state is resolved.

When the reverse rotation button GM52 shown in FIG. 6 is operated in the bean clogging state, a drive signal is output to start the top mill motor in a direction opposite to a normal rotation direction in the grinding process (a rotation direction during bean grinding). The reverse rotation button GM52 functions as a reset button for a particle size adjustment counter immediately after the initialization processing when the power is turned on, and functions as a switching button between the normal mode and the cupping mode in a normal standby state process. The reverse rotation button GM52 functions as an original button for reverse rotation of the top mill motor only in the bean clogging state. That is, when the grinder 5AM is in the abnormal state (bean clogging state) in which a predetermined rotation operation cannot be performed, if the reverse rotation button GM52 is operated, the reverse rotation operation is executed in a direction opposite to that of the predetermined rotation operation, and in the normal state, the reverse rotation operation is not executed even if the reverse rotation button GM52 is operated. In this way, even if the reverse rotation button GM52 is erroneously operated in a situation other than the bean clogging state, the top mill motor will not rotate reversely, thus ensuring safety.

The top mill motor is also a pulse motor and is PWM-controlled.

The bottom of (A) of FIG. 9 shows a graph indicating a signal intensity of a current monitoring input signal in which the current value flowing through the top mill motor is monitored and a signal with intensity corresponding to the current value is output. The current value of the top mill motor during standby (in the stop state) is 0 A, and the signal intensity of the current monitoring input signal is also 0. In the coffee bean grinding machine GM according to the second embodiment, the current value of the top mill motor during idling in which the roasted coffee beans are not ground is about 0.1 A, and the current value of the top mill motor when the roasted coffee beans are normally ground is about 0.6 A.

In step Sg352, 3 A or more is treated as an abnormal current value of the top mill motor.

In the current monitoring input signal shown in the bottom of (A) of FIG. 9, when the reverse rotation of the top mill motor is started, a waveform with very high signal intensity corresponding to current values of 3 A or more is output, but the signal intensity soon drops. The decrease in the signal intensity is a result of clearing the bean clogging by the reverse rotation, and causing an idling state. In the coffee bean grinding machine GM according to the second embodiment, the current value considered to clear the bean clogging (hereinafter, referred to as "clogging clearing current value") is set to 0.6 A in accordance with the current value of the top mill motor when normally crushing the roasted coffee beans. In the current monitoring input signal shown in the bottom of (A) of FIG. 9, the signal intensity suddenly drops, and a waveform with the signal intensity corresponding to the current value that drops below 0.6 A is output. Then, the drive signal for reversely rotating the top mill motor is turned off, and the state shifts to the normal standby state.

(B) of FIG. 9 is a diagram showing an example in which the current value of the top mill motor does not decrease to the clogging clearing current value even when the drive signal for reversely rotating the top mill motor is output three times with time intervals.

When the reverse rotation button GM52 is operated in the bean clogging state, the drive signal for reversely rotating the top mill motor is continuously output for 1 s if the current value of the top mill motor does not decrease to the clogging clearing current value.

Therefore, the top mill motor continues to rotate reversely for 1 s. The 1 s period is controlled by a reverse rotation timer which will be described later. After a pause of 1 s, the drive signal for reversely rotating the top mill motor is output again. Here, if the current value of the top mill motor does not decrease to the clogging clearing current value, the drive signal for reverse rotation is continuously output for 1 s. Furthermore, if the current value of the top mill motor does not decrease to the clogging clearing current value, the drive signal for reversely rotating the top mill motor for the third time is output continuously for 1 s after a pause of 1 s. The pause of 1 s period is controlled by a pause timer which will be described later. An output of the drive signal for the reverse rotation three times is controlled by a reverse rotation retry counter which will be described later. If the current value of the top mill motor does not decrease to the clogging clearing current value even if the drive signal for reversely rotating the top mill motor for the third time is continuously output for 1 s, the state shifts to the abnormal state, and the drive signal for the reverse rotation is not output from fourth and subsequent times. As a result, the top mill motor stops rotating.

Hereinafter, the description returns to the grinding interruption process 3 using (B) of FIG. 8. In the grinding interruption process 3, when the current value of the top mill motor is an abnormal value, the chaff fan motor is stopped (step Sg353), the main mill motor is stopped (step Sg354), and the top mill motor is stopped (step Sg356). The order of stopping these motors is not limited to this order, and the top mill motor may be stopped first or may be stopped simultaneously. After the motors are stopped, the button LED 151 lights purple (step Sg356), and the grinding interruption process 3 ends. When the current value of the top mill motor becomes the abnormal value, the operating state of the machine shifts to the bean clogging state shown in FIG. 7 regardless of whether the operation mode is the normal mode or the cupping mode. That is, regardless of the operation mode of the machine, when the state shifts to the bean clogging state and the reverse rotation button GM52 is operated, the top mill motor rotates reversely.

In addition, in the coffee bean grinding machine GM according to the second embodiment according to the second embodiment, the mode and the occurrence of the bean clogging state are irrelevant, and thus, when the state returns to the normal state (normal standby state) from the bean clogging state, the mode (normal mode or cupping mode) before the top mill 5AM is in the bean clogging state is maintained. Further, when the top mill 5AM returns from the bean clogging state to the normal state, it is possible to switch between the normal mode and the cupping mode by operating the reverse rotation button GM52.

On the other hand, if the current value of the top mill motor is not the abnormal value, it is determined whether the upper limit threshold reaching flag is set to ON (step Sg357). If the upper limit threshold reaching flag is set to ON, the chaff fan motor is stopped (step Sg358), the main mill motor is stopped (step Sg359), and the top mill motor is stopped (step Sg360). Here, the order of stopping these motors is also not limited to this order. After the motors are stopped, the button LED 151 lights orange (step Sg361), and the grinding interruption process 3 ends. Since the upper limit threshold reaching flag is set to ON, the operating state of the machine shifts to the condition insufficient state shown in FIG. 7. Conversely, if the upper limit threshold reaching flag is set to OFF, the air-cooling fan monitoring process (step Sg362) is executed, the grinding interruption process 3 ends, and the processing unit 11a executes the grinding interruption process 3 next time as well.

In the air-cooling fan monitoring process (step Sg362), first, it is determined whether an abnormality occurs in the air-cooling fan that cools the main mill motor. Specifically, the processing unit 11a determines that the abnormality occurs if a fan lock signal is output from a sensor that monitors the driving of the air-cooling fan. If the abnormality occurs, the air-cooling fan abnormality flag is set to ON, and the air-cooling fan monitoring process ends. On the other hand, if normal, the air-cooling fan abnormality flag is set to OFF, and the air-cooling fan monitoring process ends.

(A) of FIG. 10 is a flowchart showing a flow of the standby state (the top mill is in the stop state) process executed by the processing unit 11a in the standby state (the top mill is in the stop state).

The standby state (the top mill is in the stop state) process is not the interruption process, but similar to the grinding process 3 described with reference to (A) of FIG. 8, and the processing unit 11a repeatedly determines whether the grind button 150 has been operated until the grind button 150 shown in FIG. 6 is operated (step Sg220). The operation of the grind button 150 here is an operation of requesting to restart the grinding, and when the grind button 150 is operated, a top mill start timer is restarted (step Sg221). Next, the main mill stop timer started in step Sg342 is stopped (step Sg222), the same air-cooling fan monitoring process (step Sg223) as step Sg362 in (B) of FIG. 8 is executed, the button LED 151 lights blue (step Sg224), and the standby state (the top mill is in the stop state) ends. When a grinding restart request is present, the processing unit 11a next executes a grinding interruption process 2 (see FIG. 7) for starting the top mill.

(B) of FIG. 10 is a flowchart showing a flow of the standby state (the top mill is in the stop state) interruption process executed by the processing unit 11a in the standby state (the top mill is in the stop state).

The processing unit 11a starts the standby state (the top mill is in the stop state) interruption process with a timer interrupt signal as a trigger. First, in step Sg230, the same G counter adding process as in step Sg350 in (B) of FIG. 8 is executed. Next, various abnormality detection processes (step Sg231) are executed. The various abnormality detection processes (step Sg231) here are also the same as the abnormality detection processes (step Sg351) described above. Subsequently, it is determined whether the upper limit threshold reaching flag is set to ON (step Sg232). If the upper limit threshold reaching flag is set to ON, the chaff fan motor is stopped (step Sg233) and the main mill motor is stopped (step Sg234), the button LED 151 lights orange (step Sg235), and the standby state (the top mill is in the stop state) interruption process ends. Since the upper limit threshold reaching flag is set to ON, the operating state of the machine shifts to the condition insufficient state shown in FIG. 7. The order of stopping the chaff fan motor (step Sg233) and stopping the main mill motor (step Sg234) may be reversed or may be simultaneous.

On the other hand, if the upper limit threshold reaching flag is set to OFF, it is determined whether the main mill stop timer expires (whether the main mill stop timer counts up) (step Sg236). If the main mill stop timer does not expire, the same air-cooling fan monitoring process (step Sg237) as step Sg362 in (B) of FIG. 8 is executed, and the standby state (the top mill is in the stop state) interruption process ends. The processing unit 11a executes the standby state (the top mill is in the stop state) interruption process next time as well. If the main mill stop timer expires, the main mill motor is stopped (step Sg238), and the same air-cooling fan monitoring process (step Sg239) as step Sg362 in (B) of FIG. 8 is executed here as well. Next, it is determined whether the cupping mode flag is set to OFF (step Sg240). That is, it is determined whether the normal mode is set in which the chaff separation is performed by rotating the chaff fan 60A1. If the cupping mode flag is set to ON, that is, if the cupping mode does not perform the chaff separation, the standby state (the top mill is in the stop state) interruption process ends, and the operating state of the machine shifts to the normal standby state shown in FIG. 7.

If the cupping mode flag is set to OFF, that is, if the operation mode is the normal mode, after-cleaning is performed. In the normal mode, the chaff fan 60A1 is rotated while the top mill 5AM is rotating to aspirate the waste such as chaff. As described above, the set value of the chaff fan 60A1, which can be selected by operating an air volume dial 60D, are five levels from Setting 1 to Setting 5, and even at Setting 5 at which the chaff fan 60A1 is rotated most strongly, a PWM value (duty ratio) is 60%.

On the other hand, in the after-cleaning, the PWM value (duty ratio) is set to 100% and inner peripheral walls of a pipe portion 63 and a separation chamber forming portion 64 are cleaned. In step Sg241, the PWM value (duty ratio) of the chaff fan motor 60A2 is set to 100%. The chaff fan 60A1 continues to rotate at the set value selected with the air volume dial 60D until step Sg241 is executed, and when step Sg241 is executed, an aspiration force is increased and the rotation is continued without stopping.

FIG. 11 is a diagram showing a path for the coffee beans, a path for the waste such as chaff, and a path for the after-cleaning.

FIG. 11 shows the top mill 5AM, a top mill upper case 501 covering an upper portion of the top mill 5AM, the separation chamber forming portion 64, the coupling duct 661, a coupling dial 697, the worm wheel 691, a frame member 694 covering the main mill 5BM, the chute GM31, the pipe portion 63, an upper portion 61 of a collection container 60B, the inner case 60Bi disposed in a lower portion 62 of the collection container 60B, and a fan unit 60A. The outer case 60Bo disposed in the lower portion 62 of the collection container 60B is not shown.

In FIG. 11, the path for the coffee beans is indicated by a one-dot chain line. That is, the roasted coffee bean becomes cracked beans by the top mill 5AM, the cracked beans pass through the separation chamber forming portion 64 and the coupling duct 661 to be ground beans by the main mill 5BM, and the ground beans are discharged from the chute GM31.

In FIG. 11, the path for the waste such as chaff is indicated by a two-dot chain line. That is, the waste such as chaff that enters the separation chamber forming portion 64 together with the cracked beans is aspirated by the rotation of the chaff fan in the fan unit 60A, passes through the separation chamber forming portion 64 and the pipe portion 63, and arrives the collection container 60B.

In the collection container 60B, as described with reference to FIG. 5, the waste such as chaff accumulates on the bottom of the lower portion 62 of the collection container 60B (bottom surface of the outer case 60Bo shown in FIG. 5) due to own weight. The air obtained by the separation of the waste becomes the upward air current from inside the inner case 60Bi, passes through the fan unit 60A, and is exhausted to the outside of the coffee bean grinding machine GM. In this way, even if the fan unit 60A is aspirating the waste such as chaff while the top mill 5AM is rotating, if the set value is low (when the aspiration force is weak), the waste such as chaff may remain in inner regions of the pipe portion 63 and the separation chamber forming portion 64. Even if the set value is high, the waste such as chaff may adhere to the inner peripheral walls of the pipe portion 63 and the separation chamber forming portion 64 and cannot be completely removed. Therefore, after the grinding process is ended, the inner regions of the pipe portion 63 and the separation chamber forming portion 64 (inner regions surrounded by thick solid lines in FIG. 11) are aspirated with a stronger aspiration force to collect the waste such as chaff remaining in the inner regions, and to remove the waste such as chaff adhering to the inner peripheral walls. The waste such as chaff remaining in the inner regions or adhering to the inner peripheral walls arrives the collection container 60B as indicated by a thick solid line arrow and falls by own weight. By performing the after-cleaning every time the grinding process is ended, it is possible to prevent the waste such as chaff from accumulating on the inner peripheral walls.

FIG. 12 is a diagram showing an example in which the waste such as chaff is aspirated while the top mill 5AM is rotating, and the after-cleaning is performed by stronger aspiration without stopping the aspiration even if the top mill 5AM stops.

At a top of FIG. 12, the operating state of the coffee bean grinding machine GM according to the second embodiment is shown, and then, a timing chart representing ON and OFF of the grind button 150 shown in FIG. 6 is shown. A below portion shows a timing chart representing ON and OFF of the drive signal for the top mill motor, a timing chart representing ON and OFF of a drive signal for the main mill motor, and a timing chart representing ON and OFF of a drive signal for the chaff fan motor. Further, the bottom shows the PWM value that controls the rotation of the chaff fan motor.

When the grind button 150 is operated in the normal standby state, the state shifts to the grinding state, a drive-on signal is output to the main mill motor, and the main mill motor starts forward rotation. The drive-on signal is output to the chaff fan motor, and the chaff fan motor also starts the forward rotation. In this case, the rotation of the chaff fan motor is controlled by the PWM value corresponding to the set value (dial set value) selected by the air volume dial 60D shown in FIG. 6. Eventually, the top mill start timer expires, the drive-on signal is output to the top mill motor, and the top mill motor starts the forward rotation.

When the grind button 150 is operated in the grinding state, in step Sg341 shown in (A) of FIG. 8, the output of the drive-on signal to the main mill motor is ended, and the state shifts to the standby state (the top mill is in the stop state). Eventually, the main mill stop timer expires in the standby state (the top mill is in the stop state), and the output of the drive-on signal to the main mill motor is ended at step Sg238 shown in (B) of FIG. 10. As described above, in the normal mode, in step Sg241, the PWM value (duty ratio) of the chaff fan motor 60A2 is set to 100%, and the chaff fan continues to rotate while increasing the aspiration force without stopping.

As shown in (B) of FIG. 10, when the process of step Sg241 is ended, the processing unit 11a starts a cleaning timer (step Sg242), and the standby state (the top mill is in the stop state) interruption process ends. When the after-cleaning is started in this manner, the operating state of the machine shifts to the standby state (during cleaning) shown in FIG. 7. The cleaning timer counts (for example, counts 5000 ms) until an end timing of the after-cleaning (stop timing of the chaff fan motor 60A2).

The present invention is not limited to the embodiments and examples described above, and the contents thereof can be combined with each other without departing from the spirit of the present invention, and may be partially changed according to a purpose or the like. The individual terms described in the present specification are merely used for the purpose of describing the present invention, and it is needless to say that the present invention is not limited to strict meanings of the terms, and can include equivalents thereof. For example, expressions such as "device" and "portion" may be described as "unit", "module", or the like.

REFERENCE SIGNS LIST

GM coffee bean grinding machine
GM51 power switch
GM52 reverse rotation button
150 grind button
151 button LED
4 reservoir device
5 pulverizing device
5A first grinder
5AM top mill
57a fixed blade
58a rotary blade
5B second grinder
5BM main mill
57b fixed blade
58b rotary blade
6 separation device
60A chaff fan unit
60A1 chaff fan
60A2 chaff fan motor
60B collection container
60Bo outer case
60Bi inner case
11a processing unit
12 information display device
17 mobile terminal

The invention claimed is:

1. A coffee machine, comprising:
   a grinder configured to grind coffee beans by a predetermined rotation operation in a normal state; and
   an operation portion, wherein
   when the grinder is in an abnormal state in which the predetermined rotation operation cannot be performed, if the operation portion is operated, a reverse rotation operation is executed in a direction opposite to that of the predetermined rotation operation, and in the normal state, the reverse rotation operation is not executed even if the operation portion is operated.

2. The coffee machine according to claim 1, further comprising:
   a mode shift control unit configured to control mode shift of the machine, wherein
   the mode shift control unit shifts to one mode of a plurality of types of modes, and
   even when the abnormal state occurs in any one of the plurality of modes, the grinder executes the reverse rotation operation if the operation portion is operated.

3. The coffee machine according to claim 2, wherein
the plurality of types of modes include a normal mode in which waste is allowed to be separated from ground beans ground by the grinder, and
a cupping mode in which the waste is not separated from the ground beans ground by the grinder.

4. The coffee machine according to claim 2, wherein
when the grinder returns from the abnormal state to the normal state, the mode shift control unit maintains the mode before the grinder enters the abnormal state.

5. The coffee machine according to claim 1, wherein
the grinder stops a rotation operation when the state does not return to the normal state even after repeating the reverse rotation operation a predetermined number of times in the abnormal state.

\* \* \* \* \*